United States Patent [19]

Careddu

[11] Patent Number: 4,521,266

[45] Date of Patent: Jun. 4, 1985

[54] METHOD OF MANUFACTURING CORKS FOR BOTTLES

[75] Inventor: Franco Careddu, Canelli, Italy

[73] Assignee: Sugherificio P. Careddu S.p.A., Canelli, Italy

[21] Appl. No.: 514,124

[22] Filed: Jul. 15, 1983

[30] Foreign Application Priority Data

Jul. 15, 1982 [IT] Italy ............................ 67903 A/82

[51] Int. Cl.$^{3}$ ............................................ B32B 31/18

[52] U.S. Cl. ................................ 156/242; 156/245; 156/250; 156/264; 264/124

[58] Field of Search ............... 156/242, 245, 253, 254, 156/260, 264, 304.1, 250; 215/355, 358, 362, 364; 264/124

[56] References Cited

U.S. PATENT DOCUMENTS

| | | | |
|---|---|---|---|
| 1,407,655 | 2/1922 | Hornstein | 156/242 |
| 1,576,242 | 3/1926 | McManus | 156/242 |
| 1,702,600 | 2/1929 | Grupe | 264/124 |
| 1,762,138 | 6/1930 | Grupe | 264/124 |

FOREIGN PATENT DOCUMENTS

| | | | |
|---|---|---|---|
| 732502 | 9/1932 | France | 264/124 |

*Primary Examiner*—Caleb Weston

*Attorney, Agent, or Firm*—Sughrue, Mion, Zinn, Macpeak & Seas

[57] ABSTRACT

The method of manufacturing corks consists of punching the corks out from a block which is formed by moulding and then baking. At least one of the major surfaces of the block forms part of a sheet made from strips of natural cork previously placed side-by-side and glued together, with their pores arranged parallel to the plane of the said surface, the remaining portion of the block consisting of cork agglomerate.

2 Claims, 6 Drawing Figures

METHOD OF MANUFACTURING CORKS FOR BOTTLES

The present invention relates to a method of manufacturing corks for bottles, consisting of a body of cork agglomerate and a layer of natural cork applied to at least one end of the said body.

Corks of the kind specified above are more economical than corks made entirely from natural cork; the layer of natural cork serves the purpose of preventing the flavour of a beverage, such as wine, contained in the bottle from undergoing changes as a result of direct contact of the beverage with the cork agglomerate.

Corks having a layer of natural cork at both ends of the body of cork agglomerate are intended for use in bottle corking machines which are not fitted with means for orienting the cork, so as to ensure that after the bottle corking operation the cork will always have a layer of natural cork on the inside of the bottle.

A method is known from French Pat. No. 1,219,529 for the manufacture of corks of the above kind which comprises the steps of forming rods consisting of parts of cork agglomerate intercalated with one or two discs of natural cork, grinding the ends of the said rods and forming the corks by cutting the said rods.

The aforesaid method does not lend itself to the manufacture of corks in large scale mass production inasmuch as it necessitates separate manufacture of the discs of natural cork. Moreover, these discs of natural cork can only be made economically by punching thin strips of cork made by cutting a thicker sheet of natural cork parallel to the outer surface of the bark, which strips therefore have their pores directed perpendicular to the plane of the sheet. Natural cork discs so made have channels which extend throughout their thickness so that, when such discs are used in a cork for a bottle, a beverage contained in the bottle may pass through the pores into contact with the body of the cork agglomerate and undergo a change in taste.

From French Pat. No. 334,424 a method is known for the manufacture of flat corks in the form of discs of natural cork for closing wide-mouthed receptacles, such as jars or flagons.

According to this method for making a disc of cork with its pores directed parallel to the surfaces of the disc, it is necessary to carry out a sequence of operations which includes cutting a thick strip of natural cork perpendicular to the outer surface of the bark so as to make thin strips, trimming the edges of the said strips, glueing several strips side-by-side to make a thin composite sheet, and finally punching the said composite sheet.

This method would however be extremely uneconomical if it were used in the manufacture of discs of natural cork utilised in the method according to the above-cited French Pat. No. 1,219,529.

Finally, from French Pat. No. 338,533 a method is known for the manufacture of thin discs of natural cork which can be used in bottle caps, which consists of forming a block by superimposing and glueing together a number of strips of natural cork thinner than the disc it is intended to make, with their pores directed perpendicularly to the faces of the strips, cutting the block parallel to the major surfaces so as to form sheets with a thickness equal to the thickness of the final disc, and finally of punching the sheets thus made to obtain the discs.

Discs of cork made by this method will each consist of at least two superimposed layers of cork, thereby reducing, but not completely obviating the possibility of the formation of channels directed perpendicular to the surfaces of the disc, as a result of axial alignment of the pores of the said layers.

Moreover, manufacture of these discs is complicated and costly, and the use of such discs in the manufacture of a composite cork by the known means previously described would not render it possible to make corks of high quality.

The present invention has the object of providing a method which will facilitate the economical manufacture, in large-scale mass production, of bottle corks comprising cork agglomerate having, on at least one end, a layer of natural cork in which the pores are directed perpendicular to the axis of the cork.

In order to achieve the aforesaid object the method forming the present invention is characterised in that it consists of the following sequence of operations:

forming by moulding under pressure and subsequent baking a parallelepipedal block of equal height to that of the corks which it is desired to make and in which at least one of the major surfaces is part of a sheet formed from strips of natural cork disposed side-by-side and glued together, and with their pores directed parallel to the plane of the said sheet; the remaining part of the block consisting of cork agglomerate, smoothing the two major surfaces of the moulded block, and punching the said block in a direction perpendicular to its major surfaces to form the corks.

Further characteristics and advantages of the present invention will emerge from the following description with reference to the accompanying drawings, supplied purely by way of non-limiting example, in which.

Figure 1:
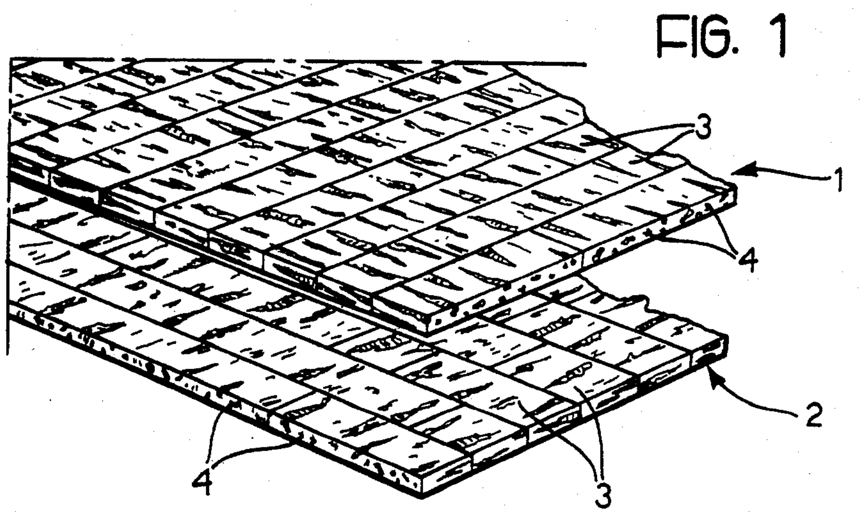
FIG. 1 is an exploded perspective view of two sheets used in a first embodiment of the method according to the invention.

In FIG. 1 there are indicated at 1 and 2 two sheets each formed of a number of strips 3 of natural cork, placed side-by-side and glued together, and having their pores 4 directed perpendicularly to the plane of the respective sheet.

Figure 2:
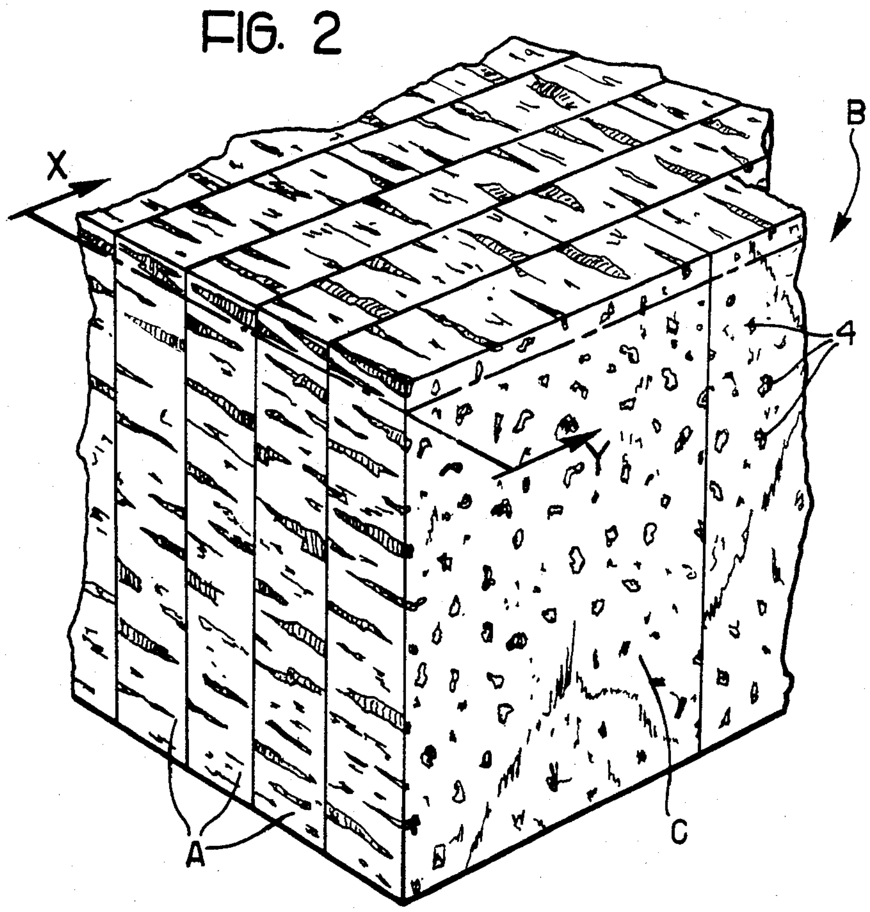
FIG. 2 illustrates a method of manufacturing industrially the sheets of FIG. 1.

Each of the sheets 1, 2 is of small thickness, for example 5 mm, and is conveniently made, as illustrated in FIG. 2, from thicker sheets A, for example 15 mm thick, of natural cork, having their pores 4 directed perpendicularly to their major surfaces. A number of these thick sheets A are placed with their major surfaces together and glued to form a parallelepipedal block B which is then cut perpendicularly to the surfaces of the block in which the pores open as indicated by the section line XY in FIG. 2.

Figure 3:
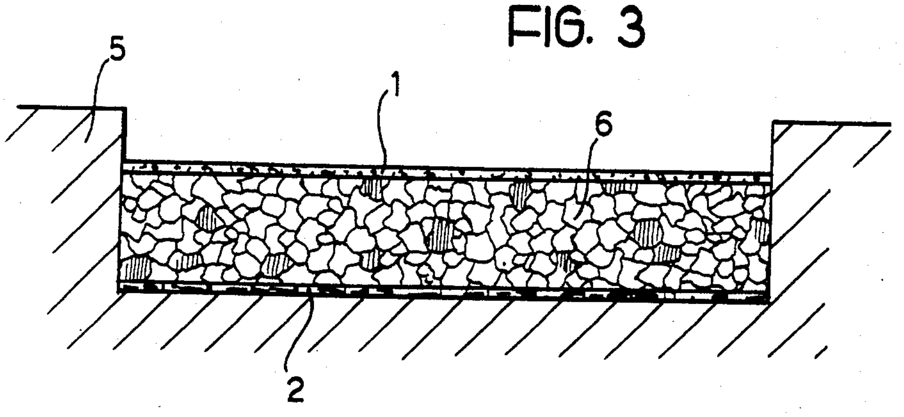
FIG. 3 is a diagrammatic cross-section illustrating the stage of manufacturing the block from which the corks are made.
Figure 4:
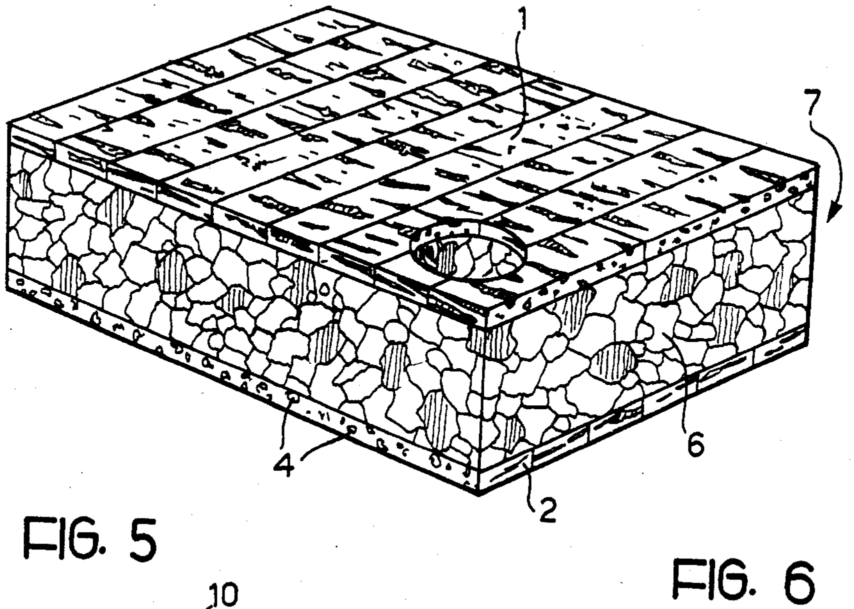
FIG. 4 is a perspective view of the block after the punching out of a cork.

As illustrated in FIG. 3 the two sheets 1 and 2 are placed together in a mould 5, sandwiching between them a mixture 6 of granulated cork and binder.

The composite formed by the sheets 1 and 2 and the mixture 6 is pressed in the mould 5 and subsequently baked so as to form a parallelepipedal block 7 having a height equal to the length of the corks it is desired to make.

The upper and lower surfaces of the block 7 are smoothed and the block is subsequently subjected to a punching operation to form corks as indicated at 8 in FIG. 5.

Each cork 8 made by the above method consists of a cylindrical body 9 of cork agglomerate provided, at its ends, with two discs 10, 11 of natural cork in each of which the pores 4 are directed perpendicularly to the longitudinal axis of the cork. This obviates the risk of liquid contained in a bottle coming into contact with the body 9 of cork agglomerate when the cork is in use.

Figure 5:
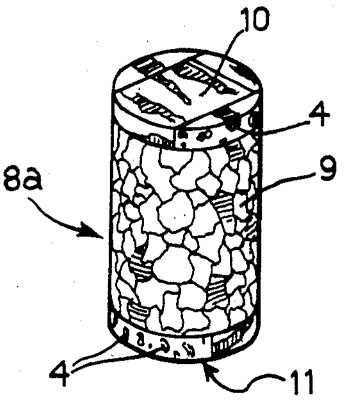
FIG. 5 is a perspective view of the cork made by punching out from the block according to FIG. 4.
Figure 6:
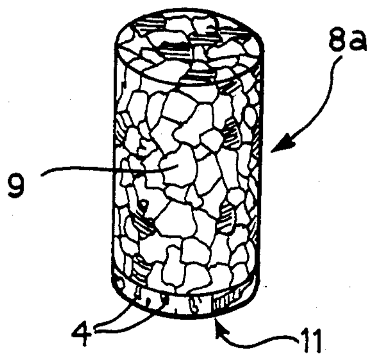
FIG. 6 is a perspective view of a cork made by a variant of the method illustrated with reference to FIGS. 1 to 5.

In the variant illustrated in FIG. 6 there is illustrated a cork 8*a* which differs from the cork 8 in FIG. 5 in that the body 9 of cork agglomerate has, on only one of its ends, a disc 11 of natural cork with the pores 4 directed perpendicularly to the longitudinal axis of the cork.

The cork 8*a* is intended for use in bottle corking machines fitted with means for orienting the corks so as to ensure that upon introducing the cork into a bottle, the disc 11 is on the inside of the bottle.

The method for the manufacture of the cork 8*a* differs from the method described for the manufacture of the cork 8 solely in that, when the block 7 is formed in the mould 5, the sheet 1 is not used but only the sheet 2 located on the bottom of the mould.

What is claimed is:

1. A method of manufacturing corks comprising the steps of:

forming a first and a second sheet from strips of natural cork disposed side-by-side and glued together and with the pores of the cork extending parallel to the plane of the said sheet, placing said first sheet on the bottom of a mold, placing a mixture of granulated cork and binder in said mold on said first sheet, placing said second sheet in said mold over said mixture of cork and binder, pressing and baking in said mold the composite formed by said two sheets and mixture so as to form a parallelpipedal block having a control core of agglomerated cork and two major surfaces defined by said sheets, smoothing said two major surfaces of said parallepipedal block, and punching the said block in a direction perpendicular to its major surfaces to form the corks.

2. A method of manufacturing corks comprising the steps of:

forming a sheet from strips of natural cork disposed side-by-side and glued together and with the pores of the cork extending parallel to the plane of said sheet, placing said sheet on the bottom of a mold, placing a mixture of granulated cork and binder in said mold on said sheet, pressing and baking in said mold the composite formed by said sheet and mixture so as to form a parallelepipedal block comprising a block of agglomerated cork bonded to said sheet with said sheet on one of the major surfaces of said block, smoothing the two major surfaces of said parallelepipedal block, and punching the said parallelepipedal block in a direction perpendicular to its major surfaces to form the corks.

* * * * *